United States Patent
Long et al.

(10) Patent No.: US 11,017,586 B2
(45) Date of Patent: May 25, 2021

(54) 3D MOTION EFFECT FROM A 2D IMAGE

(71) Applicant: ADOBE INC., San Jose, CA (US)

(72) Inventors: Mai Long, San Jose, CA (US); Simon Niklaus, Portland, OR (US); Jimei Yang, Mountain View, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/388,187

(22) Filed: Apr. 18, 2019

(65) Prior Publication Data

US 2020/0334894 A1 Oct. 22, 2020

(51) Int. Cl.
G06T 15/20 (2011.01)
G06T 7/10 (2017.01)
G06N 3/04 (2006.01)

(52) U.S. Cl.
CPC ............ *G06T 15/205* (2013.01); *G06N 3/04* (2013.01); *G06T 7/10* (2017.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2004/0100464 A1* 5/2004 Oh .................... G06T 15/10
345/419

OTHER PUBLICATIONS

Goesele et al. (Ambient Point Clouds for View Interpolation, ACM Transactions on Graphics, Jul. 2010) (Year: 2010).*
He et al. (Mask R-CNN, 2017 IEEE) (Year: 2017).*
Yang et al. (High-Resolution Image Inpainting using Multi-Scale Neural Patch Synthesis, 2017, IEEE) (Year: 2017).*
Chaurasia et al. (Depth Synthesis and Local Warps for Plausible Image-based Navigation, ACM, 2013) (Year: 2013).*
Gaurav Chaurasia,, et al., "Depth Synthesis and Local Warps for Plausible Image based Navigation", ACM Transactions on Graphics, vol. 32, No. 3 (Jul. 2013), 30:1-30:12.
John Flynn, et al., "DeepStereo: Learning to Predict New Views From the World's Imagery", in The IEEE Conference on Computer Vision and Pattern Recognition (CVPR), pp. 5515-5524.
Peter Hedman, et al., "Casual 3D Photography", ACM Transactions on Graphics, vol. 36, No. 6 (Nov. 2017), 234:1-234:15.
Peter Hedman, et al., "Instant 3D Photography", ACM Transactions on Graphics, vol. 37, No. 4 (Jul. 2018), 101:1-101:12.

(Continued)

*Primary Examiner* — Kyle Zhai
(74) *Attorney, Agent, or Firm* — F. Chau & Associates, LLC

(57) ABSTRACT

Systems and methods are described for generating a three dimensional (3D) effect from a two dimensional (2D) image. The methods may include generating a depth map based on a 2D image, identifying a camera path, generating one or more extremal views based on the 2D image and the camera path, generating a global point cloud by inpainting occlusion gaps in the one or more extremal views, generating one or more intermediate views based on the global point cloud and the camera path, and combining the one or more extremal views and the one or more intermediate views to produce a 3D motion effect.

17 Claims, 7 Drawing Sheets

(56) References Cited

OTHER PUBLICATIONS

Youichi Horry, et al., "Tour Into the Picture: Using a Spidery Mesh Interface to Make Animation from a Single Image", in Proceedings of the 24th Annual Conference on Computer Graphics and Interactive Techniques (SIGGRAPH'97), (1997) 225-232.
Dinghuang Ji, et al. Deep View Morphing, in CVPR, IEEE Computer Society, (2017) 7092-7100.
Nima Khademi Kalantari, et al., "Learning-Based View Synthesis for Light Field Cameras", ACM Transactions on Graphics, vol. 35, No. 6 (Nov. 2016), 193:1-193:10.
Hyung Woo Kang, et al., "Tour Into the Picture using a Vanishing Line and its Extension to Panoramic Images", Computer Graphics Forum, vol. 20, No. 3 (2001), 132-141.
Zhengqi Li, et al. MegaDepth: Learning Single-View Depth Prediction from Internet Photos, in the IEEE Conference on Computer Vision and Pattern Recognition (CVPR), pp. 2041-2050.
Guilin Liu, et al., "Image Inpainting for Irregular Holes Using Partial Convolutions", in Computer Vision—ECCV 2018, 16 pages.
Miaomiao Liu, et al., "Geometry-aware Deep Network for Single-Image Novel View Synthesis", in CVPR, IEEE Computer Society, (2018a), 4616-4624.
Eric Penner, et al., "Sof 3D Reconstruction for View Synthesis", ACM Transactions on Graphics, vol. 36, No. 6 (Nov. 2017), 235:1-235:11.
Ashutosh Saxena, et al., "Make3D: Learning 3D Scence Structure from a Single Still Image", IEEE Trans. Pattern Anal. Mach. Intell., vol. 31, No. 5 (May 2009), 824-840.
Pratul P. Srinivasan, et al., "Learning to Synthesize a 4D RGBD Light Field from a Single Image", in ICCV, IEEE Computer Society, (2017) 2262-2270.
Ke Colin Zheng, et al. "Parallax Photography: Creating 3D Cinematic Effects from Stills", in Proceedings of Graphics Interface 2009 (GI '09), 111-118.
Tinghul Zhou, et al., "Stereo Magnification: Learning View Synthesis Using Multiplane Images", ACM Trans. Graph., vol. 37, No. 4 (Jul. 2018), 65:1-65:12.

\* cited by examiner

3D MOTION EFFECT FROM A 2D IMAGE

BACKGROUND

This disclosure relates generally to techniques for generating a three dimensional (3D) motion effect, and more specifically to generating a 3D motion effect from a two dimensional (2D) still image.

Photographs are an important part of how people communicate and tell stories. Still images are commonly used for capturing moments or events, but they can appear static and lifeless. To improve the viewing experience, still images can be edited to create a camera motion effect. For example, an image editing technique known as the 2D Ken Burns effect allows virtual pan-and-zoom by moving a virtual camera and re-capturing the image plane. Such 2D image transformation techniques turn an image into a virtual video. However, the virtual video often looks flat as there is no scene depth and motion parallax captured by the transformation.

Advanced image/video editing systems make it possible for artists to create a more cinematic effect by augmenting photos with depth information and animating virtual camera motion, enabling motion parallax as the camera scans over a still scene. This cinematic effect is referred to as the "3D Ken Burns effect". Compared to a 2D Ken Burns effect, this 3D counterpart enables more compelling and realistic experiences. However, creating such effects is time consuming and demands sophisticated editing skills and significant user efforts. For example, creative effect synthesis may enable users to represent the scene with a simplified mesh after a manual foreground segmentation process. The image may then be projected onto that simplified scene geometry, which enables a limited 3D illusion. Generating a 3D motion effect may also include creative effect synthesis.

While realistic effects can be achieved for certain types of images, the scene representation may be too simple to handle more general types of images. Furthermore, these methods require multiple input images from varying viewpoints. Therefore, there is a need for a method, system, and apparatus that solves the problems posed by these challenges.

SUMMARY

A method for generating a three dimensional (3D) effect from a two dimensional (2D) image is described. The method includes generating a depth map based on a 2D image, identifying a camera path, generating one or more extremal views based on the 2D image and the camera path, generating a global point cloud by inpainting occlusion gaps in the one or more extremal views, generating one or more intermediate views based on the global point cloud and the camera path, and combining the one or more extremal views and the one or more intermediate views to produce a 3D motion effect.

An apparatus for generating a 3D motion effect is described. The apparatus includes a processor, memory in electronic communication with the processor, and instructions stored in the memory. The instructions are operable to cause fee processor to identify semantic information for a 2D image; generate a first depth estimate based the 2D image and the semantic information; identify image segmentation information for the 2D image; generate a second depth estimate based on fee first depth estimate and the image segmentation information; refine the second depth estimate based on a high resolution version of the 2D image; identify a camera path; generate one or more extremal views based on the 2D image and the camera path; generate a global point cloud by inpainting occlusion gaps in the one or more extremal views based at least in part on the refined second depth estimate; generate one or more intermediate views based on the global point cloud and the camera path; and combine the one or more extremal views and the one or more intermediate views to produce a 3D motion effect.

A non-transitory computer readable medium storing code for generating a 3D motion effect is described. The code comprises instructions executable by a processor to: generate a global point cloud based on a two dimensional (2D) image and a depth map of the 2D image, wherein each point in the global point cloud comprises color information, position information, and depth information; identify two end points on a camera path, wherein each of the two end points comprises a center point and a camera rotation; generate two extremal views by warping the 2D image based on the two end points; identify one or more occlusion gaps in the two extremal views; generate one or more additional points by generating data from the 2D image using a convolutional neural network (CNN); update the global point cloud using the one or more additional points: generate one or more intermediate views based on the global point cloud and the camera path; and combine the two extremal views and the one or more intermediate views to produce a 3D motion effect.

DETAILED DESCRIPTION

Figure 1:
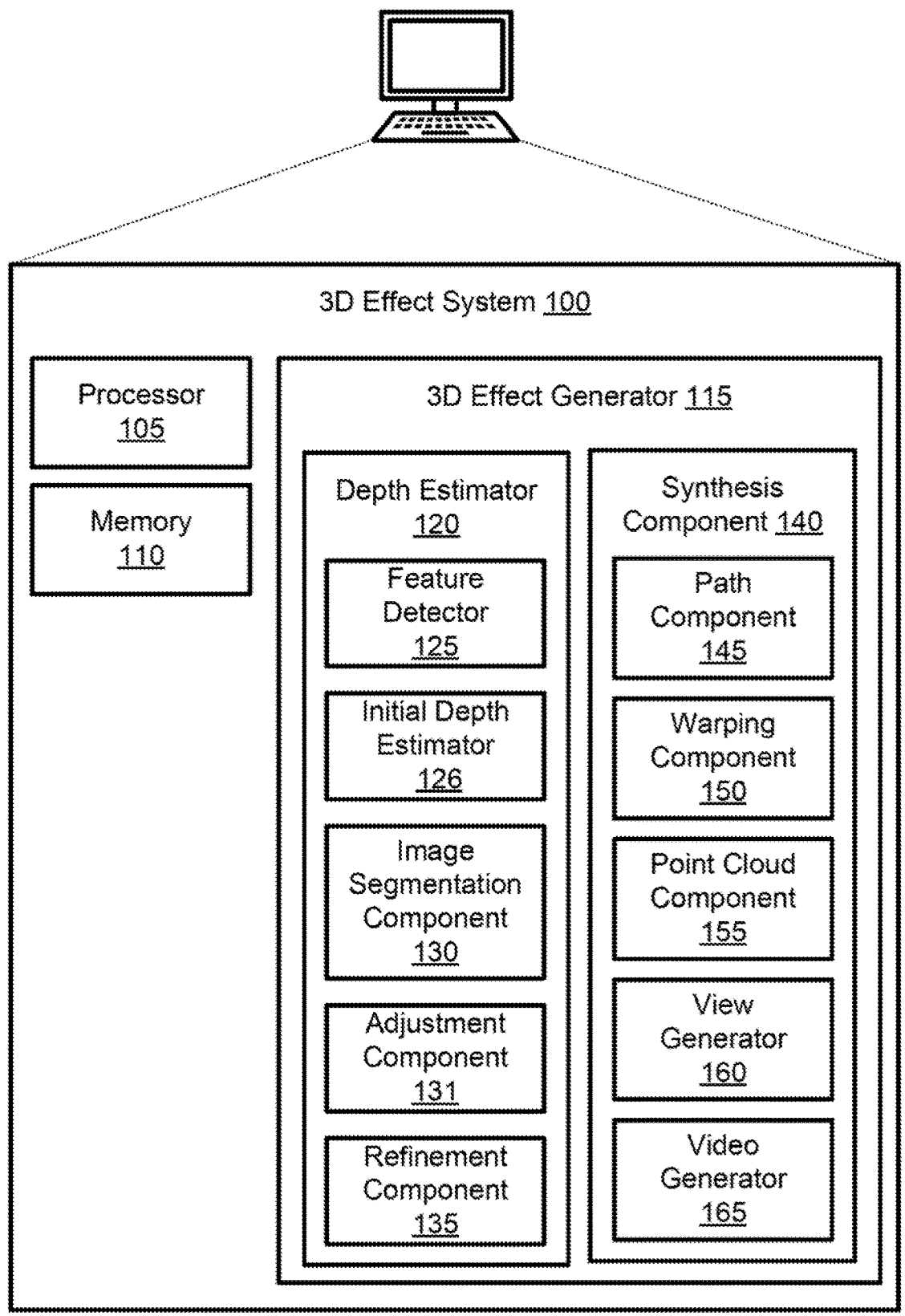
FIG. 1 shows an example of a system for generating a three dimensional (3D) motion effect in accordance with aspects of the present disclosure.

The present disclosure relates to systems and methods for generating a three dimensional (3D) motion effect front a single two dimensional (2D) image. The description set forth below is intended as a description of various embodiments and is not intended to represent the only configurations in which the subject matter of this disclosure can be practiced, it will be clear and apparent that the subject matter of this disclosure is not limited to the specific details set forth herein.

There are several fundamental challenges associated with synthesizing realistic camera motion effects from a single image. First, it is important to generate an accurate depth map of the image. Reliable and accurate scene geometry recovery from the input image may be needed to synthesize accurate content from a novel camera position from the original view. However, conventional systems that rely on manual inputs to create a depth map may be inefficient and time consuming.

Second, one must synthesize novel views based on the combination of the image and the depth map (i.e., the predicted scene geometry). For example, novel views may be synthesized for every new view in the video. View synthesis poses challenges such as dealing with occlusion and maintaining temporal consistency. As with the depth estimate problem, conventional systems often rely on manual techniques for creating these intermediate views, Thus, the present disclosure describes systems and methods for addressing these challenges in an efficient manner, and thereby creating a realistic 3D motion effect using a single image.

Example embodiments of the present disclosure include generating a depth map based on a 2D image, generating extremal views based on the 2D image, a camera path, and the depth map, generating a global point cloud by inpainting occlusion gaps in the one or more extremal views, generating intermediate views based on the global point cloud, and combining the views to produce a 3D motion effect.

In other words, creating 3D effects from a single still photo may be accomplished in several stages, First, the photo is separated into different layers (i.e., based on depth), Then a depth-based arrangement is performed in a virtual 3D space. Based on the arrangement, additional points may be inpainted to avoid holes when the virtual camera deviates from its original position.

After the additional points are added to a global point cloud, new views can be generated using a process referred to as novel view synthesis. That is, novel view synthesis refers to generating novel views of 3D objects or scenes from input images taken from a sparse set of viewpoints. This is applicable far a wide range of applications, including virtual and augmented reality, 3D display technologies, and image/video manipulation. In some cases, novel view synthesis may be accomplished using Image Based Rendering (IBR) techniques. In some cases, novel view synthesis may be based on a machine learning process. Learning based view synthesis may be accomplished using deep neural networks. When employing methods which focus on direct synthesis, the views may be generated directly through the network in an end-to-end manner.

The effectiveness of the novel view synthesis depends heavily on the accuracy of the single-image depth estimation. Single-image depth estimation is the prediction of depth relations based on a single input image. For example, annotated depth image datasets may be used to enable monocular depth estimation. The quality of the predicted depth maps may vary depending on the image type. The methods described herein minimize geometric and semantic distortions as well as inaccurate depth boundaries, which enable generating high quality novel view synthesis results.

Some embodiments of the present disclosure describe a framework to automatically produce the 3D Ken Burns effect from a single input image. The framework includes a depth prediction model, which predicts scene depth from the input image. Therein, a deep neural network for depth prediction and train the network in a geometry-aware manner is provided. The depth prediction is further coupled with a segmentation-based depth adjustment process to enable effective depth prediction for view synthesis. A depth-based synthesis model is further created, that allows the generation of novel views along the desired camera path.

Given the input image and the predicted depth map, the synthesis model jointly predicts the image and the depth map at the target view using a context-aware view synthesis framework. Using the synthesis model, start and end views (and, in some cases, other extremal views) of the camera paths are synthesized from the input image and the predicted depth map. A global point cloud can then be obtained from these extremal views. This point cloud is then used render all intermediate views of the target video, resulting in the full video for the 3D Ken Burns effect. Experiments with a wide variety of image content show that these exemplary methods enable realistic synthesis results.

To synthesize the 3D Ken Burns effect, exemplary methods first estimate the depth map from an input image. Using existing depth prediction methods, issues that arise include geometric distortion and semantic distortion. A method according to an embodiment of the present disclosure provides a deep neural network, for depth prediction, and training the network on a large-scale dataset with accurate ground truth depth. The benefits derived include improved scene geometry and depth boundaries.

In certain embodiments of the present disclosure, from the input image and the associated depth map, a sequence of novel views is synthesized to produce an output video for the 3D Ken Burns effect. The synthesis process handles two problems. The first problem includes disocclusion. For example, as the camera changes position compared to the original input view, disocclusion necessarily happens in areas unseen by the camera at the input views. To solve this problem, new information is generated to fill in those occlusion areas during synthesis. The second step includes overcoming temporal inconsistency. For example, as the synthesized views are presented as a video, they need to be synthesized in a temporally consistent manner. Conventional approaches that synthesize each view independently is not only computationally inefficient, but also problematic due to the difficulty in enforcing consistent hallucinated content.

To address these problems, in certain embodiments of the present disclosure, the input view is warped to the two extreme views within the video, and subsequently, color and depth-inpainting are performed to obtain the complete target (extreme) views, from the extreme views with corresponding depth maps, a global point cloud can be constructed. These steps enable consistent synthesis of all views using the standard image warping technique, and a light-weight and high-quality synthesis pipeline.

The depth prediction pipeline and novel view synthesis approach, as provided in certain embodiments of the present disclosure, enable a complete system for generating 3D Ken Burns effect from a single image. The method, system, and apparatus provide a fully automatic solution. The system automatically determines the shirt and end views, and a candidate set of results are proposed to the users. In addition to the fully automatic mode, which generates a plausible effect with just a single click, the system also contains a user-control mode in which the users can control the start and end views. An intuitive user interface is provided to achieve the effect with desired camera paths.

In certain embodiments of the present disclosure, the method of 3D Ken Burns effect synthesis first predicts the depth map from an input image, then performs depth-based view synthesis from the input image and the predicted depth map. The two-component approach allows the model to more explicitly capture the scene geometry, which enables better synthesis results with less geometric distortions. In certain embodiments of the present disclosure, the depth prediction and refinement modules provided generate high quality novel view synthesis.

FIG. 1 shows a system for generating a three dimensional (3D) motion effect in accordance with aspects of the present disclosure. 3D effect system 100 includes processor 105, memory 110, and 3D effect generator 115. 3D effect generator 115 includes depth estimator 120 and synthesis component 140. In some embodiments, the 3D effect generator 115 may be a software component stored in memory 110. In other examples, 3D effect generator 115 may be a hardware or firmware component.

In some examples, 3D effect system 100 may be a computing device such as a server, personal computer, laptop computer, mainframe computer, personal assistant, mobile device, or any other suitable processing apparatus.

A processor 105 may include an intelligent hardware device, (e.g., a general-purpose processing component, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 105 may be configured to operate a memory array using a memory controller, in other cases, a memory controller may be integrated into processor. The processor 105 may be configured to execute computer-readable instructions stored in a memory to perform various functions.

Memory 110 may include RAM, ROM, or a hard disk. The memory 110 may be solid state or a hard disk drive, and may include store computer-read able, computer-executable software including instructions that, when executed, cause a processor to perform various functions described herein. In some cases, the memory 110 may contain, among other things, a BIOS which may control basic hardware or software operation such as the interaction with peripheral components or devices. In some cases, a memory controller may operate memory cells as described herein. In some cases, memory controller may include a row decoder, column decoder, or both. In some cases, memory cells within a memory 110 may store information in the form of a logical state.

In example embodiments, 3D effect system 100 includes one or more artificial neural networks (ANN). An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal can process it and then transmit the processed signal to other connected nodes.

In some cases, the signals between nodes comprise real numbers, and the output of each node may be computed by a function of the sum of its inputs. Each node and edge may be associated with one or more node weights that determine how the signal is processed and transmitted. During the training process, these weights may be adjusted to improve the accuracy of the result (i.e., by minimizing a loss function which corresponds in some way to the difference between the current result and the target result). The weight of an edge may increase or decrease the strength of the signal transmitted between nodes.

In some cases, nodes may have a threshold below which a signal is not transmitted at all. The nodes may also be aggregated into layers. Different layers may perform different transformations on their inputs. The initial layer may be known as the input layer and the last layer may be known, as the output layer. In some cases, signals may traverse certain layers multiple times.

Depth estimator 120 is configured to generate a depth map based on a two dimensional (2D) image. Depth estimator 120 may generate a first depth estimate based the 2D image and semantic information. Depth estimator 120 may then generate a second depth estimate based on the first depth estimate and the image segmentation information. Depth estimator 120 may then upsample the feature map using a linear upsampling function to produce the semantic information. Depth estimator 120 may include feature detector 125, initial depth estimator 126, image segmentation component 130, adjustment component 131, and refinement component 135.

Feature detector 125 may identify semantic information tor the 2D image. For example, feature detector 125 may extract a feature map from a layer of a Visual Geometry Group (VGG)-19 convolutional neural network (CNN). The semantic information is identified based on the feature map. In some cases, the semantic information may be abstract semantic information as it is represented by VGG features (i.e., rather than explicit semantic labels).

Initial depth estimator 126 may generate an initial depth estimate (i.e., the first depth estimate) based on the image and the output of the feature detector 125. In one example, the initial depth estimator 126 may be a CNN having a modified GridNet architecture.

Image segmentation component 130 may identify image segmentation information for the 2D image. Image segmentation component 130 may also extract object information using a mask regional convolutional neural network (Mask R-CNN). The image segmentation information is based on the object information.

Adjustment component 131 may adjust the initial (i.e., first) depth estimate using the output of the image segmentation component 130 to create a second depth estimate. In one example, the adjustment component may utilize a random sample consensus (RANSAC) method to adjust the initial depth estimate.

Refinement component 135 may refine the second depth estimate based on a high resolution version of the 2D image, wherein the depth map is based on the second depth estimate. In some examples, the second depth estimate is refined using a CNN. For example, to improve the resolution, ail additional neural network may be implemented to perform the depth upsampling. The upsampling may be guided by a high-resolution image while simultaneously addressing depth boundaries.

Synthesis component 140 is configured to synthesize novel view's based on the depth map generated by depth estimator 120. Synthesis component 140 may include path component 145, warping component 150, point cloud component 155, view generator 160, and video generator 165.

Path component 145 may identify a camera path. In some examples, the camera path comprises a plurality of camera positions, wherein each of the plurality of camera positions comprises a center point and a camera rotation. Identifying a camera path may involve choosing a start point and an end point in a conceptual 3D space, and selecting a line or curve between the start point and the end point. In some cases, a camera angle may be selected for each point on the path.

Warping component 150 may generate one or more extremal views based on the 2D image and the camera path. Warping component 150 may also identify a point on the camera path, wherein the one or more extremal views am generated by warping the 2D image and the occlusion gaps are a result of warping the 2D image. For example, the one or more extremal views may be generated by selecting the start point and the end point of the camera path for, alternatively, one or more intermediate points), identifying image segments (i.e., corresponding to features in the image) at different depths within the image, and adjusting the relative position of the image segments based on die selected point and the camera angle as compared to an inferred camera position and angle of the original image (i.e., accounting for parallax).

Point cloud component 155 is configured to generate a global point cloud by inpainting occlusion gaps in the one or more extremal views. In some examples, the inpainting comprises generating one or more additional points in the global cloud corresponding to the occlusion gaps. In some examples, the one or more additional points are generated using a CNN. In some examples, each point in the global point cloud comprises color information, position information, and depth information.

View generator 160 is configured to generate one or more intermediate views based on the global point cloud and the camera path. View generator 155 may select a number of intermediate views based at least in pan on a target frame rate and a target video length of the 3D motion effect. For example, the view generator may identify a path and a camera angle, and select "visible" points from the global points cloud that would be visible by a camera at that point on the path (e.g., this can be done conceptually by extending a set of lines from the camera path through the global point cloud across a range of directions and selecting the first point in the global point cloud that each line intersects). These points may then be combined into an intermediate view.

Video generator 165 is configured to combine the one or more extremal views and the one or more intermediate views to produce a 3D motion effect. In some examples, the 2D image comprises the only image input for generating the 3D motion effect. For example, a video effect may be created by concatenating the set of views into a video file, where each view transitions to the subsequent view after a predetermined time period (i.e., a time period that is sufficiently small to allow a viewer to experience a smooth motion effect).

Experiments with a wide variety of image content show that the depth prediction model found in certain embodiments of the invention, coupled with the synthesis framework, enable plausible 3D Ken Burns effect for a majority of cases without any user intervention. However, in certain scenarios, users may desire to adjust the predicted depth map to obtain different effects. Thus, according to an embodiment, an intuitive parallax control is provided to flexibly allow the users to select results with more or less parallax effects.

The parallax control may be modeled with depth linear remapping. The scaling factor and bias terms of the affine re-mapping function may be used to control the perceived parallax. The camera path may be determined by linearly interpolating between the two end views. The end views can be determined either automatically using an algorithm (automatic mode) or interactively by the users (view control mode).

In automatic mode, results may be automatically generated for three types of camera paths: zooming, scanning, elevating. In view control mode, the user may determine the cropping windows to indicate the start and end views. The spatial location of the window center indicates the horizontal and vertical translation, while the scale of the window indicates the depth-wise translation of the view with respect to the original image.

In some examples, the system may provide controls which can be toggled by the users to enter a depth refinement mode. In this mode, the user may brush over the image plane to indicate local regions to correct or control the parallax slider to control the amount of parallax in the result.

Figure 2:
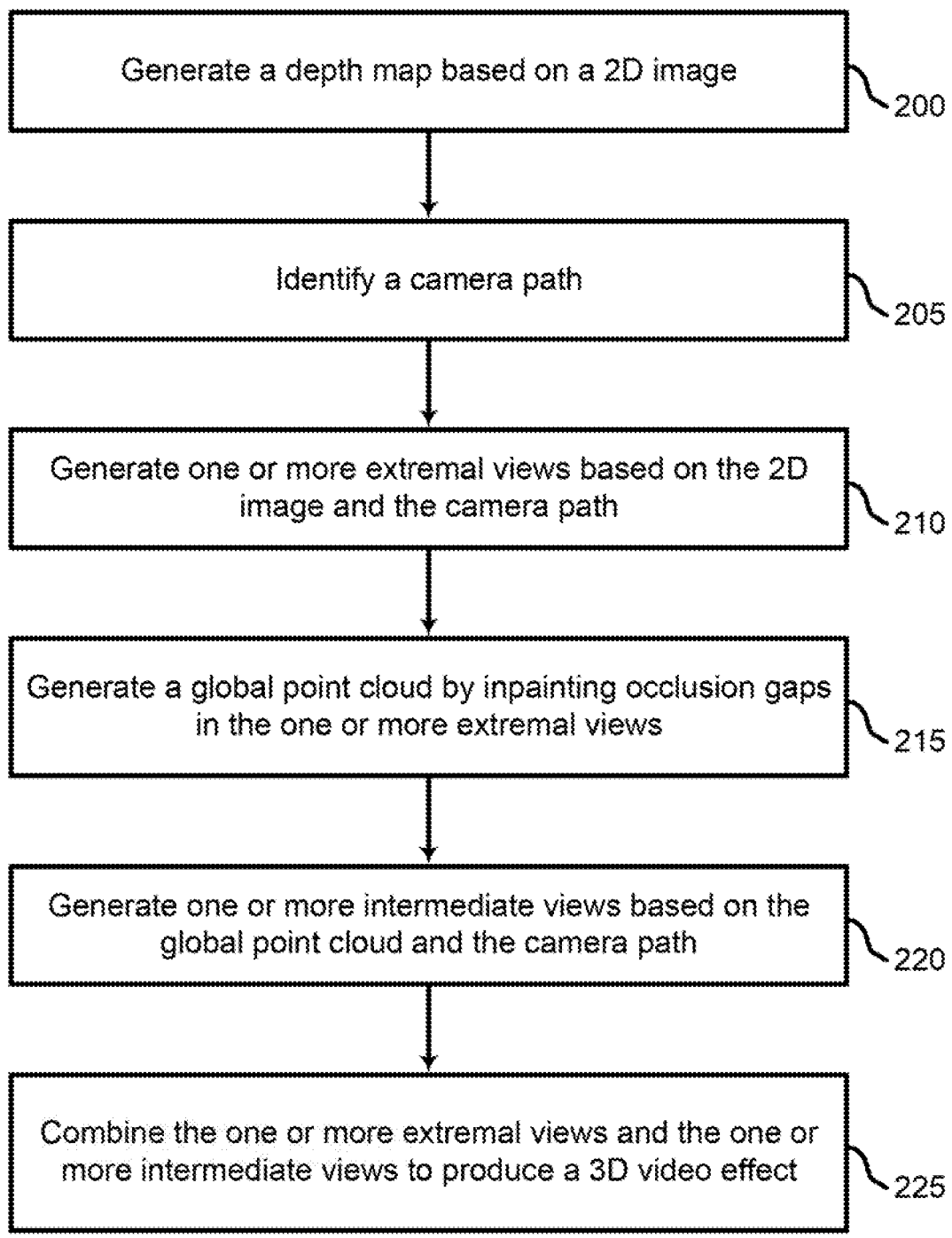
FIG. 2 shows an overview of a process for generating a 3D effect from a two dimensional (2D) image in accordance with aspects of the present disclosure.

FIG. 2 shows an overview of a process for generating a 3D effect from a 2D image in accordance with aspects of the present disclosure. While FIG. 2 represents an overview of the process for generating the 3D motion effect, a more detailed description of the individual steps may be found with reference to subsequent figures.

In some examples, these operations of FIG. 2 may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 200, the 3D effect system generates a depth map based on a 2D image. In some cases, the operations of this step may refer to, or be performed by, a depth estimator as described with reference to FIG. 1. A more detailed description of how to generate the depth map is described below with reference to FIGS. 3 and 4.

At step 205, the 3D effect system identifies a camera path. In some cases, the operations of this step may refer to, or be performed by, a path component as described with reference to FIG. 1.

At step 210, the 3D effect system generates one or more extremal views based on the 2D image and the camera path. In some cases, the operations of this step may refer to, or be performed by, a warping component as described with reference to FIG. 1.

At step 215, the 3D effect system generates a global point cloud by inpainting occlusion gaps in the one or more extremal views. In some cases, the operations of this step may refer to, or be performed by, a point cloud component as described with reference to FIG. 1.

At step 220, the 3D effect system generates one or mote intermediate views based on the global point cloud and the camera path. In some cases, the operations of this step may refer to, or be performed by, a view generator as described with reference to FIG. 1. A more detailed description of how the global point cloud is created, and how it is used to generate intermediate view's may be found below with reference to FIGS. 5 and 6.

At step 225, the 3D effect system combines the one or more extremal views and the one or more intermediate views to produce a 3D motion effect, in some cases, the operations of this step may refer to, or be performed by, a video generator as described with reference to FIG. 1.

Figure 3:
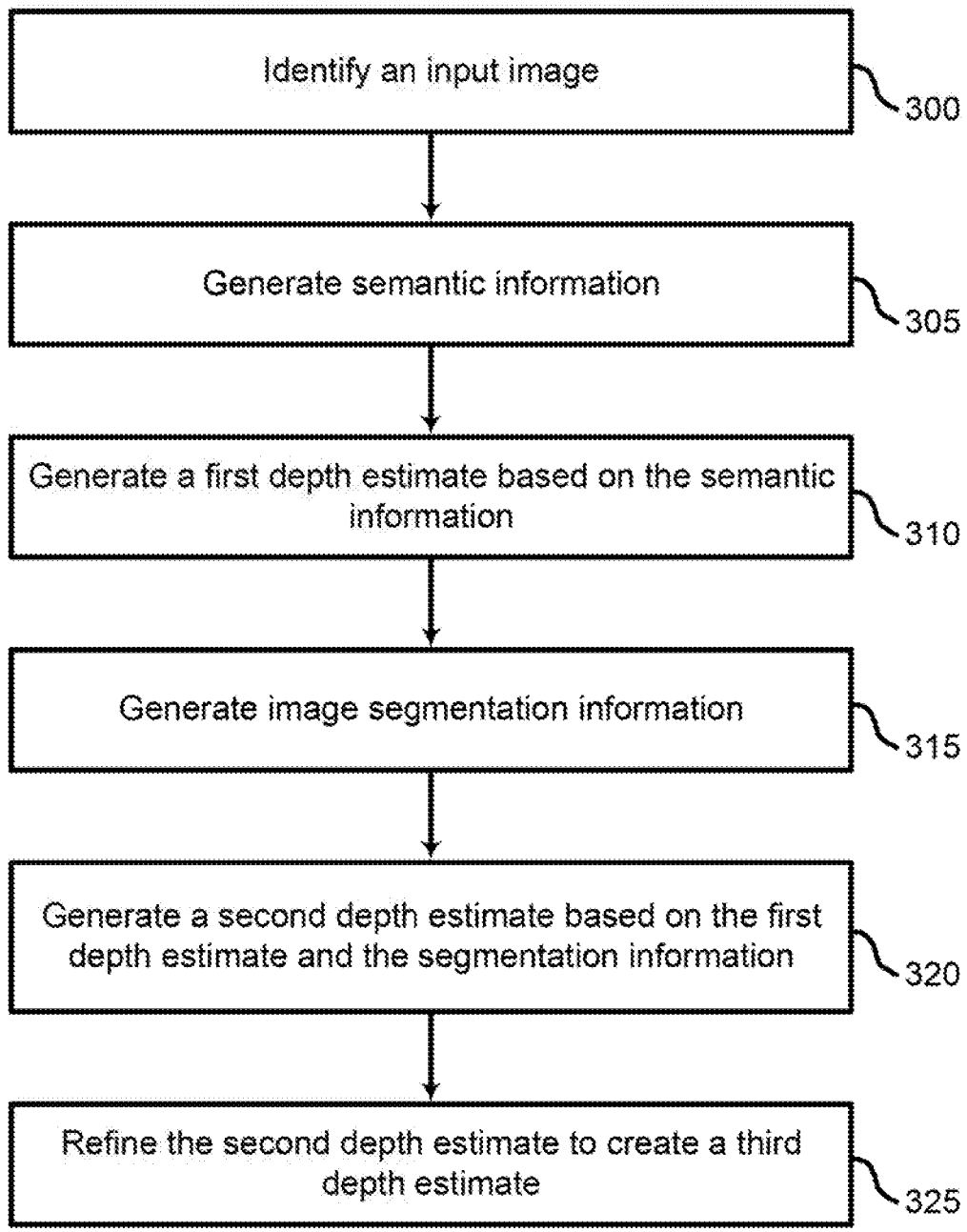
FIGS. 3 and 4 show a process for a depth map based on a two dimensional (2D) image in accordance with aspects of the present disclosure.

FIG. 3 shows a process for generating a depth map based on a 2D image in accordance with aspects of the present disclosure. FIG. 3 represents an overview of the process for creating a depth map, which is then illustrated and described in further detail with reference to FIG. 4.

In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. In some examples, these steps may be performed by the depth estimator described above with reference to FIG. 1.

At step 300, the system may identify an input image. In some cases, the operations of this step may refer to, or be performed by, a depth estimator as described with reference to FIG. 1 and may be performed according to the systems and methods described above with reference to FIG. 2.

At step 305, the system may generate semantic information. In some cases, the operations of this step may refer to, or be performed by, a feature detector as described with reference to FIG. 1 and may be performed according to the systems and methods described above with reference to FIG. 2.

At step 310, the system may generate a first depth estimate based on the semantic information. In some cases, the operations of this step may refer to, or be performed by, a depth estimator as described with reference to FIG. 1 and may be performed according to the systems and methods described above with reference to FIG. 2.

At step 315, the system may generate image segmentation information. In some cases, the operations of this step may refer to, or be performed by, an image segmentation component as described with reference to FIG. 1 and may be performed according to the systems and methods described above with reference to FIG. 2.

At step 320, the system may generate a second depth estimate based on the first depth estimate and the segmentation information. In some cases, the operations of this step may refer to, or be performed by, a depth estimator as described with reference to FIG. 1 and may be performed according to the systems and methods described above with reference to FIG. 2.

At step 325, the system may refine the second depth estimate to create a third depth estimate. In some cases, the operations of this step may refer to, or be performed by, a refinement component as described with reference to FIG. 1 and may be performed according to the systems and methods described above with reference to FIG. 2.

Figure 4:
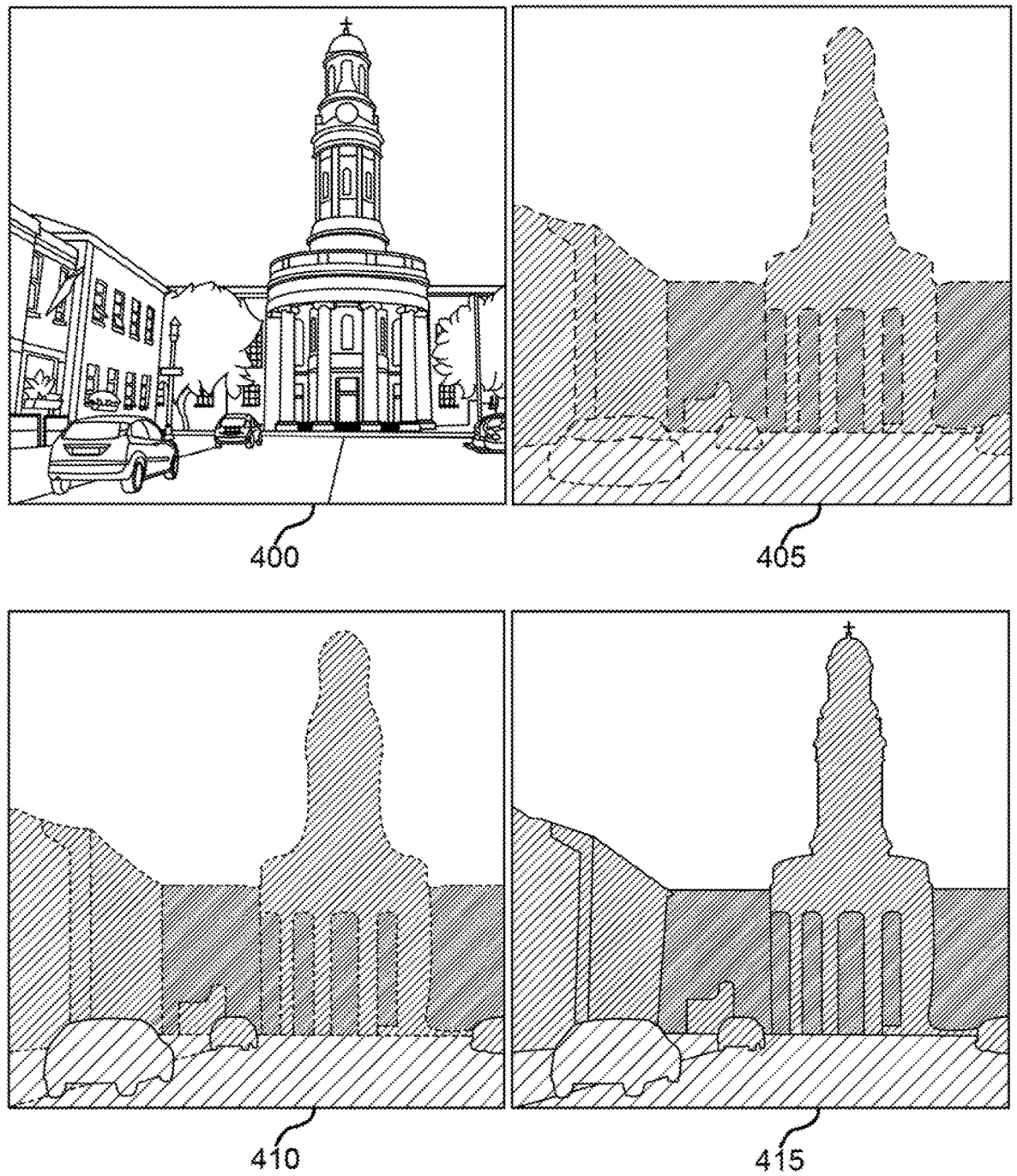

FIG. 4 shows an example of a process for generating a depth map based on a 2D image in accordance with aspects of the present disclosure. The example shown includes input image 400, first depth estimate 405, second depth estimate 410, and third depth estimate 415. In some examples, the third depth estimate 215 may represent the depth map output of the depth estimator described above with reference to FIG. 1. The process by which these depth estimates are produced is described in greater detail below.

In certain embodiments of the present disclosure, the method, system, and devices described may estimate a depth map from the input image 400. In some examples, this process may be referred to as monocular depth estimation (which may be a type of computer vision prediction). Depth estimation methods may be improved using deep learning techniques and large scale depth datasets. The systems anti methods of the present disclosure may improve on existing systems with respect to at least three major issues:

(1) Geometric distortions. Aspects of the present disclosure may enable a 3D motion effect system to capture certain geometric relations between different pixels in the depth map. As a result, geometric distortion such as waving planes may be reduced.

(2) Semantic distortions. By explicitly taking the semantics of objects and scene elements into account, depth values may be assigned consistently inside the regions of the same scene elements, which leads to a more natural synthesis in the resulting images. This may prevent distortions such as parts of an object sticking to the ground plane, or different parts of an object moving inconsistently and subsequently becoming torn apart.

(3) Inaccurate depth boundaries. By processing the input image at a high resolution at certain stages, the systems and methods described herein reduce the occurrence of inaccurate depth boundaries. For example, the resulting images avoid depth boundaries that are stretched after warping the input image according to the estimated depth.

In certain embodiments of the present disclosure, a depth estimation pipeline, along with the training framework dedicated to address these issues, are provided. To do so, the depth estimation is separated into three steps. In a first step, depth estimation may be performed using a low resolution image, guided by the semantic information extracted using a machine learning model such as VGG-19. In a second step, the depth map is adjusted according to the instance level segmentation of model such as mask R-CNN to further avoid object-semantic distortions. In a third step, depth boundaries are refined, guided by the input image while upsampling the low-resolution depth estimate. These steps are described in more detail below.

Depth Estimation. In certain embodiments of the present disclosure, a depth prediction neural network predicts the depth map (i.e., first depth estimate 405) at low resolution to allow for efficient training as well as for leveraging global visual context in the image. To further enable semantic-aware depth prediction, additional semantic guidance may be provided by augmenting the input of the network with the semantic feature maps extracted from an interior layer of the neural network. For example, the information may be extracted from the pool_4 layer of a VGG-19 network.

Providing explicit access to the abstract semantic information encourages the network to better capture the global semantic information for predicting depth with better geometry for large scene structures. Although a depth estimation network may be trained to predict the depth only using semantics (i.e., information from a feature detector such as the VGG-19 network described above) and without direct access to the input image, in some cases providing limited access to the image information may provide superior depth quality as well as generalization capability. For example, a relatively small channel size may be used for the convolutional layers in a First portion of the neural network that takes the image itself as input. By contrast, the channel size for a second portion of the neural network where the semantic features are inserted may be substantially larger (e.g., twice as large or more).

Architecture. In certain embodiments of the present disclosure, a CNN such as a modified GridNet architecture may be used for initial depth estimation. The grid architecture may contain a configuration of rows and columns. An exemplary grid architecture includes six row's and four columns, where the first two columns perform downsampling and the last two columns perform upsampling. This multi-path GridNet architecture allows the network to learn how to optimally combine feature representations from multiple scales.

For example, the input image may be fed into the first row, while inserting the semantic features from VGG-19 into the fourth row of die grid (i.e., to limit the access to the input image and force the network to focus on semantics, in an exemplary grid architecture). In one example, the first three rows have a channel size of 32, 64, and 128 respectively while the fourth through sixth row have 512 channels each. As such, a majority of the parameters may reside in the bottom half of the network (effectively forcing the network to make use of semantics and in-turn supporting the generalization ability of the depth estimation network).

Loss functions. In certain embodiments of the present disclosure, the depth estimation is trained using a point-wise $l_1$, as well as a scale invariant gradient loss. Certain embodiments use a scale invariant gradient loss. Specifically, given the ground truth inverse depth $\xi$, the estimated inverse depth $\hat\xi$ may be supervised using the $l_1$-based loss as follows:

$$\mathcal{L}_{depth}=\Sigma_{i,j}|\xi(i,j)-\hat\xi(i,j)| \quad (1)$$

To encourage smoother gradient changes and more pronounced depth discontinuities, a scale invariant gradient loss may be provided:

$$\mathcal{L}_{grad} = \sum_{h\in\{1,2,4,8,16\}}\sum_{i,j}\|g_h[\xi](i,j)-g_h[\hat\xi](i,j)\|_2 \quad (2)$$

where the discrete scale invariant gradient g is defined as $$g_h[f](i,j) = \left(\frac{f(i+h,j)}{|f(i+h,j)|+|f(i,j)|}, \frac{f(i,j+h)-f(i,j)}{|f(i+h,j)|+|f(i,j)|}\right)^\top \quad (3)$$

In the final loss function, to supervise the depth estimation network, the scale invariant gradient loss is overemphasized as follows:

$$\mathcal{L}_{total}=0.001\cdot\mathcal{L}_{depth}+\mathcal{L}_{grad} \quad (4)$$

These accurate depth boundaries allow for the synthesis of the 3D Burns effect.

Training, in certain embodiments of the present disclosure, training is performed using an algorithm far first-order gradient-based optimization of stochastic objective functions. Certain embodiments use the algorithm Adam with $\alpha=0.001$, $\beta_1=0.9$ and $\beta_2=0.999$, where we depth estimation network is trained for $2\cdot10^6$ iterations. In certain embodiments of the present disclosure, computer-generated training data may be used. The computer-generated training datasets may comprise photo-realistic renderings which provide high-quality depth information, thus supporting the network to make geometrically consistent predictions.

Depth Adjustment. In creating 3D Ken Burns effects manually, (i.e., using image/video editing software), subjects of interest may be assigned to a particular plane in three dimensional space. In certain embodiments of the present disclosure, instance-level segmentation masks from, for example, Mask R-CNN, may be used to achieve a similar result (i.e., second depth estimate 410). Specifically, in certain embodiments of the present disclosure, masks for salient objects, such as humans or dogs are selected, and the depth map is adjusted to map these objects to a geometric plane. For example, in the second depth estimate 410 points corresponding to several cars are adjusted to be on the same depth plane.

In certain embodiments of the present disclosure, random sample consensus (RANSAC) is used for evaluation to fit a plane into the geometric shape represented by the estimated depth. In certain embodiments of the present disclosure, a step may be introduced for updating the depth values such that the salient objects will map to the estimated plane. In certain embodiments, an additional heuristic step is included, where the heuristic includes fitting a plane whose normal is facing towards the camera and is positioned upright on the ground plane. In addition to this heuristic, an additional step of assigning the smallest depth value from the bottom of the salient object to the entire segment is included in certain embodiments of the present disclosure.

Depth Refinement. The depth estimation network found in certain embodiments of the present disclosure may be designed to reduce geometric distortions, while the depth adjustment addresses semantic distortions. To improve the resolution (especially at boundary regions), an additional neural network may be implemented to perform the depth upsampling (i.e., to produce third depth estimate 415). The upsampling may be guided by a high resolution image while simultaneously addressing depth boundaries. The additional depth refinement neural network may correspond to the refinement component described with reference to FIG. 1.

Architecture. Certain embodiments include a depth refinement architecture. A depth refinement architecture may include neural network such as a U-Net with, for example, three downsampling blocks that use strided convolutions, and three corresponding upsampling blocks that use convolutions in combination with bilinear upsampling. The input image is inserted into the depth refinement architecture. The estimated depth is inserted at the bottom, allowing the network to learn how to downsample the input image, for the purposes of guiding the depth during upsampling.

Loss functions. Similar to the depth estimation network as described here, the same or similar $L_{total}$ loss may be employed with the depth refinement network. A result of using $L_{total}$ loss is to generate accurate depth boundaries. In certain embodiments of the present disclosure, loss functions are performed using an algorithm for first-order gradient-based optimization of stochastic objective functions. Certain embodiments use the algorithm, the Adam optimization algorithm with $\alpha=0.0001$, $\beta_1=0.9$ and $\beta_2=0.999$, where the depth refinement network is trained for, e.g., $2\cdot10^6$ iterations. In certain embodiments of the present disclosure, additional computer-generated training data is incorporated as described above. Use of the computer-generated training data may provide accurate ground truth depth boundaries.

In certain embodiments of the present disclosure, additional steps include the downsampling and blurring, and in some cases, distorting the ground truth depth. In certain embodiments, the ground truth depth with the input image, serve as input to the depth refinement network during training. The ground truth depth serves as reference, and as input to the depth refinement network during training. In some implementations, the distortion augmentation of the ground depth is particularly significant in these steps, which mimics inaccurate depth boundaries of the estimated depth.

Thus, the depth estimation pipeline is designed to address each of the identified issues when using depth estimation methods tor generating the 3D Ken Burns effect: geometric distortions, semantic distortions, and inaccurate depth boundaries.

Figure 5:
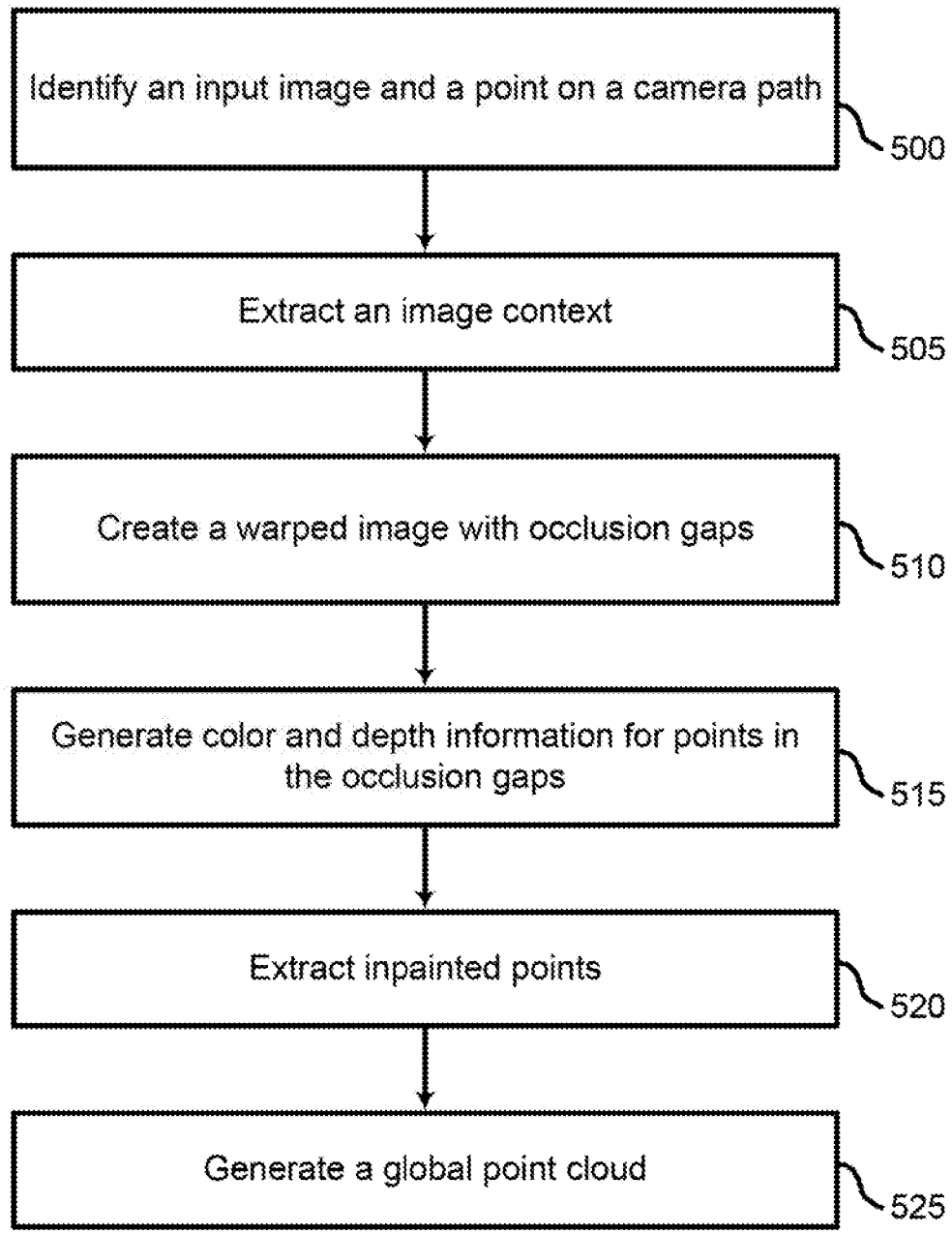
FIGS. 5 and 6 show a process for generating a global point cloud in accordance with aspects of the present disclosure.

FIG. 5 shows an example of a process for generating a global point cloud in accordance with aspects of the present disclosure. FIG. 5 show's an overview of the process of generating a global point cloud, and illustration of the process and further detail about the architecture for performing the process may be found with reference to FIG. 6.

In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. In some examples, these steps may be performed by the synthesis component described above with reference to FIG. 1.

At step 500, the system may identify an input image and a point on a camera path according to the methods described above with reference to FIG. 4. In some examples, this may be performed by the path component described above with reference to FIG. 1.

At step 505, the system may extract an image context according to the methods described above with reference to FIG. 4.

At step 510, the system may warp the input image based on the point on the camera path to create a warped image with occlusion gaps according to the methods described above with reference to FIG. 4. In some examples, this may be performed by the warping component described above with reference to FIG. 1. For example, image segments may be moved relative to each other to account for a parallax effect based on the position of the point relative to a camera point and angle associated with the original image.

At step 515, the system may generate color and depth information for points in the occlusion gaps (i.e., inpaint the gaps) according to the methods described above with reference to FIG. 4. In some examples, this may be performed by the point cloud component described above with reference to FIG. 1. For example, image input (i.e. foe warped image and, optionally, the original image) may be used as input to a modified GridNet architecture to produce an output image that includes additional output points corresponding to the occlusion gaps.

At step 520, the system may extract inpainted points according to the methods described above with reference to FIG. 4. In some examples, this may be performed by the point cloud component described above with reference to FIG. 1. The points may be extracted because they may be relevant to other synthesized images that have overlapping occlusions gaps. This may reduce or eliminate foe need to apply a neural network to each intermediate view to fill in the occlusion gaps independently. That is, when a point is generated, it may be reused for other views.

At step 525, the system may generate a global point cloud by steps 510 through 520 until the point cloud is complete. In some examples, this may be performed by the point cloud component described above with reference to FIG. 1. In some cases, the steps 510 through 520 may be repeated multiple times. In some cases, the warped views used to generate the additional points of the global point cloud may be initially selected as end points of the 3D motion effect. In other examples, intermediate views may be selected and the view may be gradually adjusted until the end views are reached. At each stage of the adjustment, additional points may be added to the global point cloud.

Figure 6:
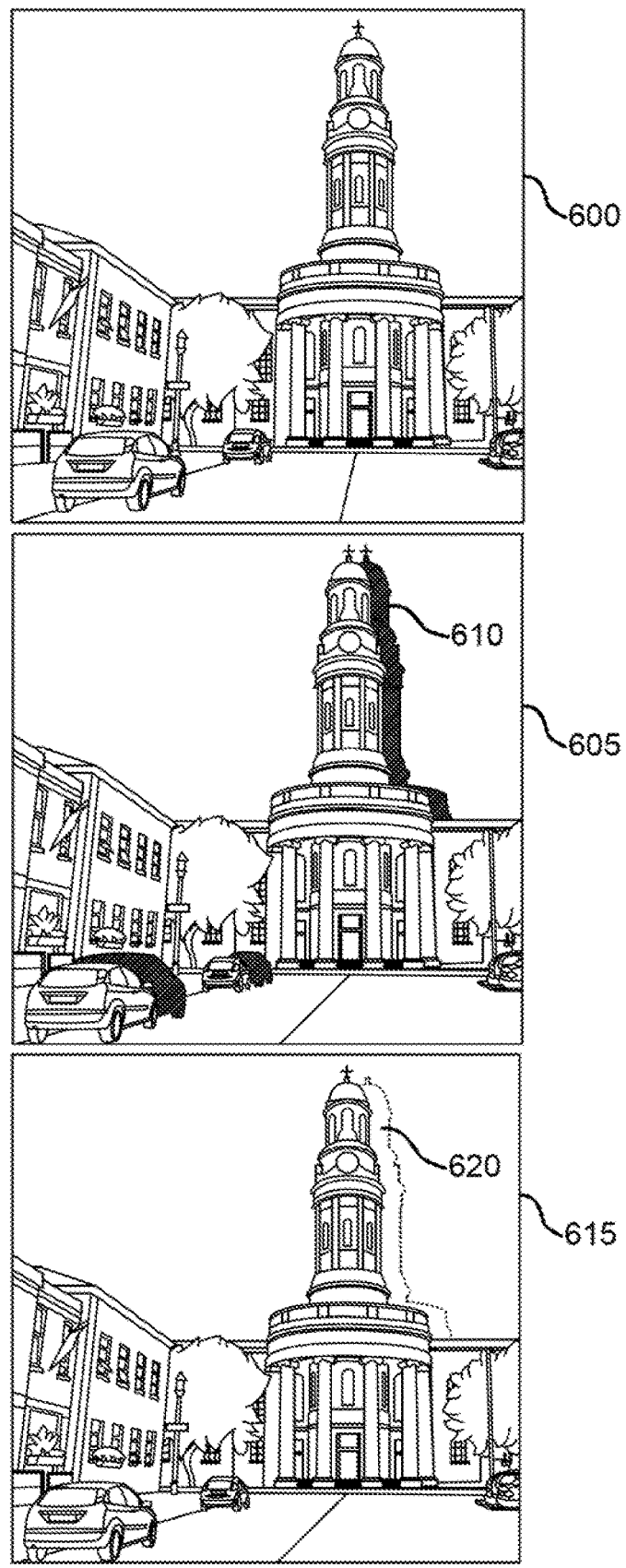

FIG. 6 shows an example of a process for generating a global point cloud in accordance with aspects of the present disclosure. The example shown includes input image 600, warped image 605, and inpainted image 615. Warped image 605 may include occlusion gaps 610, and inpainted image 615 may include additional points 620 corresponding to the locations of the occlusion gaps 610. A global point cloud generated based on the inpainted image 615 may include additional points 620 and may represent an intermediate output of the synthesis component described above with reference to FIG. 1. The global point cloud may be used to generated intermediate views, which may be synthesized into a 3D motion effect.

Once the depth map has been estimated from the input image (as described above with reference to FIGS. 2 and 3), a 3D Effect System may generate each video frame for the 3D Ken Burns effect result. Each video frame corresponds to a novel view determined by the location of a virtual camera along a pre-determined camera path. Given the input image 600, the estimated depth map, and one target camera position, the content of the novel view (i.e., warped image 605) can be generated by warping the input image 600 into the novel view according to the depth map. However, warping from only one input view may not be sufficient to produce the final results. When the viewpoint changes, disocclusion may occur, which leaves holes in the warped views (i.e., occlusion gaps 610).

In certain embodiments of the present disclosure, synthesis on the extreme views of the camera path may be performed. The synthesis may be performed in the image domain, as well as in the depth domain at the extreme views. With the depth maps and the images of the two extreme a global point cloud can be established, which can be projected onto each intermediate view to obtain the final synthesis result, Thus, given an image and a predicted depth map at a source view, the 3D Effect System may generate the image content and depth maps at the two extreme views.

3D warping is performed to warp both the input image 600 and the depth map of the source view to the target extreme view. In addition to the warping process, a neural network may be used to inpaint the missing color and depth information to produce additional points 620 within the inpainted image 615. The inpainted regions (which are filled by additional points 620) can then be used to extend the geometry of the global point cloud, which addresses disocclusion that may occur when rendering novel views from the global point cloud.

Context Extraction, Incorporating contextual information may facilitate generating acceptable novel view synthesis results. For example, when warping an input image 400 and subsequently working on the warped image 605, per-pixel context information can be warped together with the image, which describes the local surrounding of each pixel before it has been warped. Certain embodiments of the present disclosure incorporate contextual information to generate novel view synthesis results. In one example, context information is extracted from the input image 600 as well as the estimated depth (e.g., using one or more convolutional layers). This contextual information is then warped together with the image and its depth estimate before performing the color and depth inpainting. In doing so, the context extraction network may be trained jointly with the inpainting network, allowing it to extract information that is useful during the inpainting after the image has been warped.

Color and Depth Inpainting. In certain embodiments, after warping the input image consisting of color, depth, and context information and revealing disocclusions, a color- and depth-inpainting network is used to fill the holes in the warped representation. While the missing depth information needs to be filled to subsequently extend the point cloud, it also serves as an additional form of supervision for the inpainting network, since it indirectly is supervised on whether the color information should belong to the foreground or the background region. The following describe the details, loss functions, as well as training of this network.

Architecture. In certain embodiments of the present disclosure, a neural network such as a modified GridNet architecture may be used for the inpainting network (i.e., the point cloud component as described with reference to FIG. 1). Using such an inpainting network may enable the 3D Effect System to learn how to combine representations at multiple scales. The architecture may contain a grid configuration of rows and columns. An exemplary architecture includes three rows and six columns. As with the depth estimator, the point cloud component may employ a GridNet architecture for our inpainting network due to its ability to learn how to combine representations at multiple scales.

Loss Functions, in certain embodiments of the present disclosure, a color and perceptual reconstruction model is used. The color and perceptual reconstruction model may define an $l_1$-based per pixel loss, which may be parameterized to focus on the inpainted regions. In certain embodiments, to facilitate details in the inpainted regions a perceptual and style loss model is further included. Since depth-inpainting may also be performed, a point-wise $l_1$ loss may also be included. Thus, the loss for supervising the inpainting network may be as follows.

$$L_{total} = L_{valid} + 6 \cdot L_{hole} + 0.05 \cdot L_{percep} + 240 \cdot L_{style} + L_{depth} \quad (5)$$

Training. In certain embodiments of the present disclosure, loss functions may be performed using an algorithm for first-order gradient-based optimization of stochastic objective functions. In certain embodiments, the Adam algorithm may be used with $\alpha=0.0001$, $\beta_1=0.9$ and $\beta_2=0.999$ (e.g., where the inpainting network is trained using $2 \cdot 10^6$ iterations).

Figure 7:
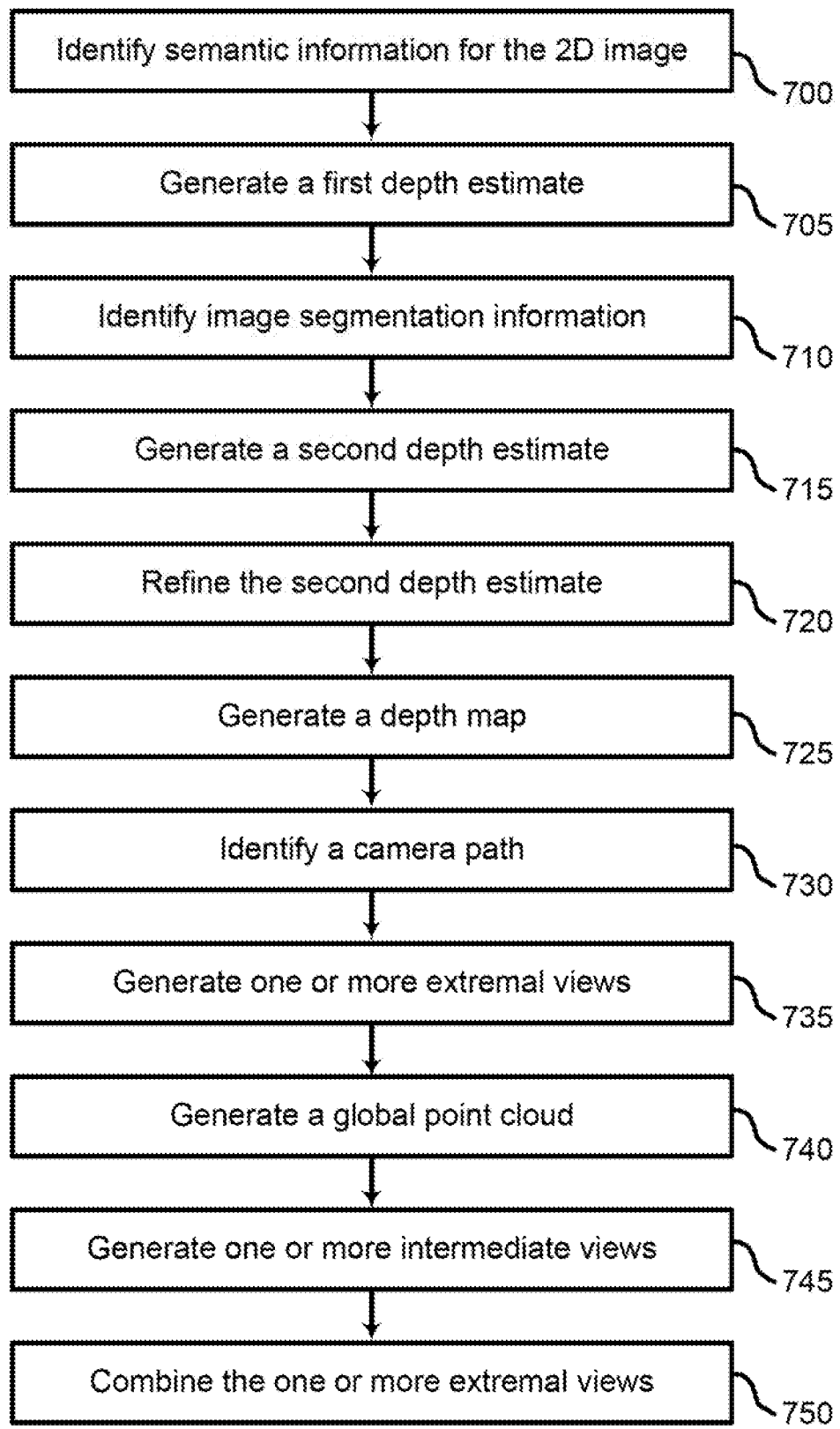
FIG. 7 shows an example of a process for generating a 3D effect from a 2D image in accordance with aspects of the present disclosure.

FIG. 7 shows an example of a process for generating a 3D effect from a 2D image in accordance with aspects of the present disclosure. Specifically, FIG. 7 shows the example of the process for generating a depth estimate shown in FIGS. 3 and 4 incorporated into a process for generating a 3D motion effect similar to that described with reference to FIG. 2.

In some examples, the operations of FIG. 7 may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 700, the system may identify semantic information for the 2D image. In some cases, the operations of this step may refer to, or be performed by, a feature detector as described with reference to FIG. 1.

At step 705, the system may generate a first depth estimate based the 2D image and the semantic information. In some cases, the operations of this step may refer to, or be performed by, a depth estimator as described with reference to FIG. 1.

At step 710, the system may identify image segmentation information for the 2D image. In some cases, the operations of this step may refer to, or be performed by, an image segmentation component as described with reference to FIG. 1.

At step 715, the system may generate a second depth estimate based on the first depth estimate and die image segmentation information. In some cases, the operations of this step may refer to, or be performed by, a depth estimator as described with reference to FIG. 1.

At step 720, the system may refine the second depth estimate based on a high resolution version of the 2D image. In some cases, the operations of this step may refer to, or be performed by, a refinement component as described with reference to FIG. 1.

At step 725, the system may generate a depth map based on a 2D image based on the second depth estimate. In some cases, the operations of this step may refer to, or be performed by, a depth estimator as described with reference to FIG. 1.

At step 730, the system may identify a camera path. In some cases, the operations of this step may refer to, or be performed by, a path component as described with reference to FIG. 1.

At step 735, the system may generate one or more extremal views based on the 2D image find the camera path. In some cases, the operations of this step may refer to, or be performed by, a warping component as described with reference to FIG. 1.

At step 740, the system may generate a global point cloud by inpainting occlusion gaps in the one or more extremal views. In some cases, the operations of this step may refer to, or be performed by, a point cloud component as described with reference to FIG. 1.

At step 745, the system may generate one or more intermediate views based on the global point cloud and the camera path. In some cases, the operations of this step may refer to, or be performed by, a view generator as described with reference to FIG. 1.

At step 750, the system may combine the one or more extremal views and die one or more intermediate views to produce a 3D motion effect. In some cases, the operations of this step may refer to, or be performed by, a video generator as described with reference to FIG. 1.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring die described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to tire examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for generating a three dimensional (3D) motion effect, comprising:
    identifying semantic information for a two dimensional (2D) image;
    generating a first depth estimate based on the 2D image and the semantic information;
    identifying image segmentation information for the 2D image;
    generating a second depth estimate based on the first depth estimate and the image segmentation information; and
    refining the second depth estimate based on a high resolution version of the 2D image,
    identifying a camera path;
    generating one or more extremal views based on the 2D image and the camera path;
    generating a global point cloud by inpainting occlusion gaps in the one or more extremal views based on the second depth estimate, wherein the occlusion gaps are a result of warping the 2D image to generate the one or more extremal views;
    generating one or more intermediate views based on the global point cloud and the camera path; and
    combining the one or more extremal views and the one or more intermediate views to produce a 3D motion effect.

2. The method of claim 1, further comprising:
    extracting a feature map from a layer of a VGG-19 convolutional neural network (CNN), wherein the semantic information is identified based on the feature map.

3. The method of claim 1, further comprising:
    upsampling the feature map using a linear upsampling function to produce the semantic information.

4. The method of claim 1, further comprising:
    extracting object information using a mask regional convolutional neural network (R-CNN), wherein the image segmentation information is based on the object information.

5. The method of claim 1, wherein:
    the second depth estimate is refined using a CNN.

6. The method of claim 1, further comprising:
    identifying a point on the camera path, wherein the one or more extremal views are generated by warping the 2D image according to the point on the camera path, and the occlusion gaps are a result of warping the 2D image.

7. The method of claim 6, wherein:
    the inpainting comprises generating one or more additional points in the global cloud corresponding to the occlusion gaps.

8. The method of claim 7, wherein:
    the one or more additional points are generated using a CNN.

9. The method of claim 7, wherein:
    each point in the global point cloud comprises color information, position information, and depth information.

10. The method of claim 1, wherein:
    the camera path comprises a plurality of camera positions, wherein each of the plurality of camera positions comprises a center point and a camera rotation.

11. The method of claim 1, further comprising:
    selecting a number of intermediate views based at least in part on a target frame rate and a target video length of the 3D motion effect.

12. The method of claim 1, wherein:
    the 2D image comprises the only input for the 3D motion effect.

13. An apparatus for generating a three dimensional (3D) motion effect, comprising:
    a processor and a memory storing instructions and in electronic communication with the processor, the processor being configured to execute the instructions to:
    identify semantic information for a two dimensional (2D) image;
    generate a first depth estimate based the 2D image and the semantic information;
    identify image segmentation information for the 2D image;
    generate a second depth estimate based on the first depth estimate and the image segmentation information;
    refine the second depth estimate based on a high resolution version of the 2D image;
    identify a camera path;
    generate one or more extremal views based on the 2D image and the camera path;
    generate a global point cloud by inpainting occlusion gaps in the one or more extremal views based at least in part on the refined second depth estimate, wherein the occlusion gaps are a result of warping the 2D image to generate the one or more extremal views;
    generate one or more intermediate views based on the global point cloud and the camera path; and
    combine the one or more extremal views and the one or more intermediate views to produce a 3D motion effect.

14. The apparatus of claim 13, the processor being further configured to execute the instructions to:
    extract a feature map from a layer of a VGG-19 convolutional neural network (CNN), wherein the semantic information is identified based on the feature map.

15. The apparatus of claim 13, the processor being further configured to execute the instructions to:
    upsample the feature map using a linear upsampling function to produce the semantic information.

16. The apparatus of claim 13, the processor being further configured to execute the instructions to:

extract object information using a mask regional convolutional neural network (R-CNN), wherein the image segmentation information is based on the object information.

17. The apparatus of claim 13, wherein:
the second depth estimate is refined using a CNN.

* * * * *